(12) United States Patent
Cherney

(10) Patent No.: US 10,520,924 B2
(45) Date of Patent: Dec. 31, 2019

(54) AUGMENTED REALITY CONTROL FOR MACHINE

(71) Applicant: Deere & Company, Moline, IL (US)

(72) Inventor: Mark J. Cherney, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 48 days.

(21) Appl. No.: 15/799,681

(22) Filed: Oct. 31, 2017

(65) Prior Publication Data

US 2019/0129384 A1    May 2, 2019

(51) Int. Cl.
| | |
|---|---|
| *G09G 5/00* | (2006.01) |
| *G05B 19/414* | (2006.01) |
| *G02B 27/01* | (2006.01) |
| *G05B 19/18* | (2006.01) |
| *G05B 19/402* | (2006.01) |
| *G06F 3/01* | (2006.01) |
| *G06T 19/00* | (2011.01) |

(52) U.S. Cl.
CPC .......... *G05B 19/414* (2013.01); *G02B 27/01* (2013.01); *G05B 19/182* (2013.01); *G05B 19/402* (2013.01); *G06F 3/011* (2013.01); *G06F 3/017* (2013.01); *G06T 19/006* (2013.01); *G05B 2219/00* (2013.01); *G05B 2219/32014* (2013.01)

(58) Field of Classification Search
CPC ......... G06T 19/006; G06F 3/011; G06F 3/017
See application file for complete search history.

(56) References Cited

U.S. PATENT DOCUMENTS

| | | | |
|---|---|---|---|
| 2015/0376868 A1 | 12/2015 | Jackson | |
| 2016/0147233 A1 | 5/2016 | Whinnery | |
| 2016/0263964 A1* | 9/2016 | Wall | B60H 1/00742 |
| 2017/0316613 A1* | 11/2017 | Wright | G06F 3/011 |
| 2017/0330381 A1* | 11/2017 | Wright | G06F 3/011 |

OTHER PUBLICATIONS

German Search Report issued in counterpart application No. 102018216706.0 dated Sep. 16, 2019. (56 pages).
Song, P. et. al., A handle bar metaphor for virtual object manipulation with mid-air interaction, Proceedings of the SIGCHI Conference on Human Factors in Computing Systems, May 2012, pp. 1297-1306.

\* cited by examiner

*Primary Examiner* — Weiming He
(74) *Attorney, Agent, or Firm* — Michael Best & Friedrich LLP

(57) ABSTRACT

Systems and methods are described for controlling an operation of machinery using augmented reality or virtual reality. A controller is configured to detect an object visible via a display based at least in part on sensor data received from an object sensor. The controller then generates and outputs on the display a graphical element corresponding to the detected object. The controller then monitors for interactions between an operator's hand and the graphical element and transmits control signals to a machinery actuator to control an operation of a tool of the machinery based at least in part on one or more detected interactions between the operator's hand and the graphical element.

15 Claims, 10 Drawing Sheets

AUGMENTED REALITY CONTROL FOR MACHINE

BACKGROUND

The present invention relates to systems and methods for controlling the operation of machinery such as, for example, a motor grader.

SUMMARY

In one embodiment, the invention provides a system for controlling an operation of machinery using augmented reality or virtual reality. A controller is configured to detect an object visible via a display based at least in part on sensor data received from an object sensor. The controller then generates and outputs on the display a graphical element corresponding to the detected object. The controller then monitors for interactions between an operator's hand and the graphical element and transmits control signals to a machinery actuator to control an operation of a tool of the machinery based at least in part on one or more detected interactions between the operator's hand and the graphical element.

In another embodiment, the invention provides a method of operating machinery using augmented reality. A controller receives sensor data from an object sensor that is positioned with a field of view that at least partially overlaps with a field of view of the display. The controller detects an object that is visible via the display based at least in part on the sensor data received from the object sensor and outputs on the display a graphical element corresponding to the detected object. In response to detecting an interaction between the operator's hand and the displayed graphical element, the controller transmits a control signal to a machinery actuator. The machinery actuator controls an operation of the machinery based on the control signal such that the operation of the machinery corresponds to the detected interaction of the operator's hand with the graphical element.

In yet another embodiment, the invention provides a system for adjusting a position of a blade of a motor grader using augmented reality. The system includes a headset and a controller. The headset includes a display and an object sensor. The display includes an at least partially transparent graphical display screen configured to output graphical elements in a field of view of an operator wearing the headset while real world objects are visible to the operator through the at least partially transparent graphical display screen. The object sensor is positioned on the headset with a field of view that at least partially overlaps with the field of view of the operator wearing the headset. The controller is configured to detect a location of the blade of the motor grader in the field of view of the operator based at least in part on sensor data received from the object sensor. The controller generates and outputs on the display a virtual handle for the blade of the motor grader. The controller detects when the operator's hand is contacting the virtual handle. The controller is configured to transmit a control signal to a motor grader actuator in response to detecting movements of the operator's hand while contacting the virtual handle. The control signal causes the motor grader actuator to adjust a position of the motor grader blade in a direction and a magnitude corresponding to the detected movement of the operator's hand while contacting the virtual handle.

In some embodiments, the controller is further configured to send a second control signal that makes smaller-scale, fine-tuning adjustments to the position of the motor grader blade in response to detecting a tapping motion of the operators hand towards a location on the blade of the motor grader.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
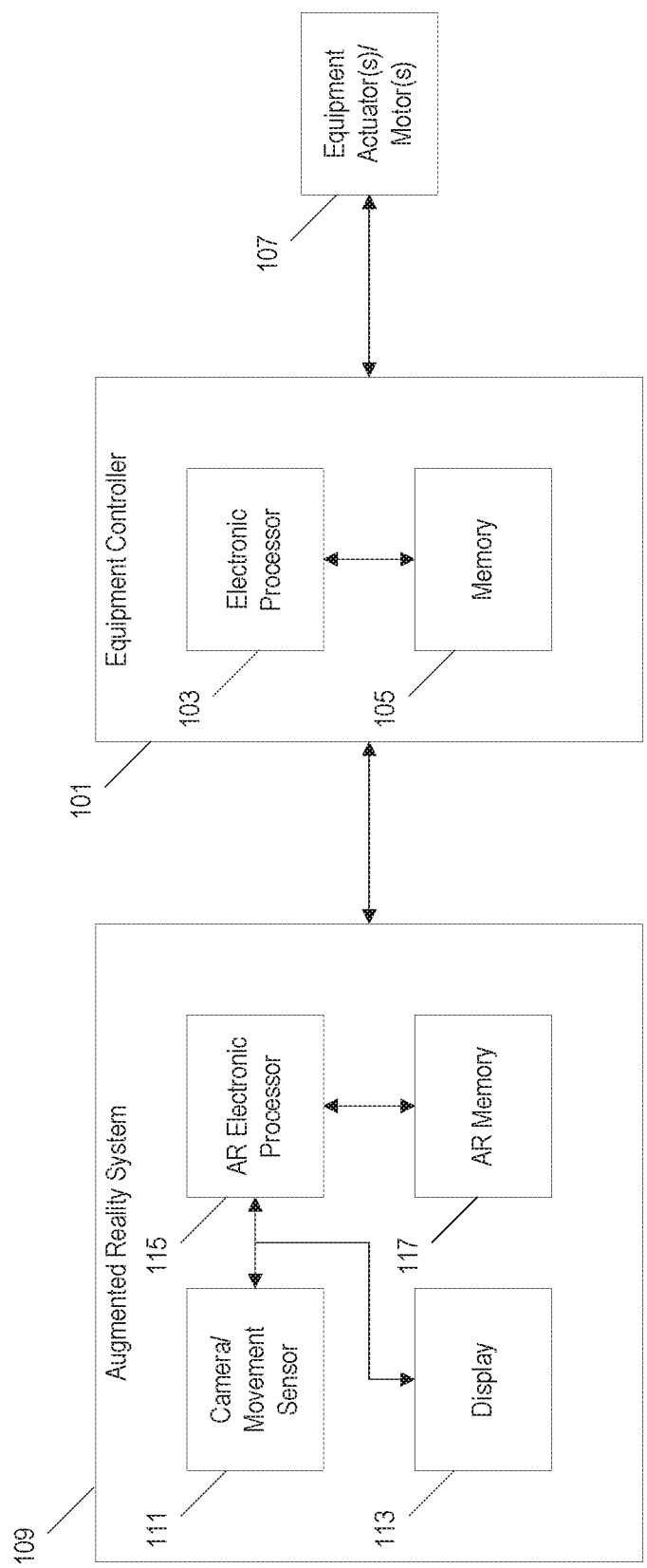
FIG. 1 is a block diagram of a system for controlling a machine using augmented reality according to one embodiment.

FIG. 1 illustrates one example of a system that uses augmented reality technology to control the operation of a machine. In some implementations, the machine may include an agricultural, construction, landscaping or forestry equipment such as, for example, a motor grader, a knuckleboom loader, a tree feller/harvester, or an excavator. An equipment controller 101 includes an electronic processor 103 and a non-transitory computer-readable memory 105. The memory 105 is in communication with the electronic processor 103 and stores data and instructions that are executed by the electronic processor 103 to provide system functionality including, for example, the methods described herein. The equipment controller 101 is communicatively coupled (either directly or indirectly) to one or more equipment actuators/motors 107.

The equipment actuator(s)/motor(s) 107 controls and adjusts a position and/or operation of a tool or equipment based on control signals and/or instructions received from the equipment controller 101. For example, in an implementation where the machine includes a motor grader, the equipment actuator(s)/motor(s) 107 may include one or more motors and/or hydraulic devices configured to adjust a position, angle, and height of a blade of the motor grader based on control signals received from the equipment controller 107. In another example, where the machine includes a knuckleboom loader or another machine for grabbing and lifting one or more logs, the equipment actuator(s)/motor(s) 107 may include one or more motors and/or hydraulic devices configured to adjust a position of a grabber and to open/close the grabber in response to control signals received from the equipment controller 107. In some examples, where the machine includes a saw for cutting a tree, the equipment actuator(s)/motor(s) 107 may include a motor the causes a saw blade to rotate at a particular speed in response to control signals received from the equipment controller 107. In yet another example, where the machine includes an excavator, the equipment actuator(s)/motor(s) 107 may include one or more motors and/or hydraulic devices that are configured to adjust a position of an excavator bucket and to cause the excavator bucket to move in a digging motion in response to control signals received from the equipment controller 107.

In the example of FIG. 1, the equipment controller 101 is also communicatively coupled to an augmented reality system 109. The augmented reality system 109 includes one or more cameras and/or movement sensors 111 and a video display 113. The augmented reality system 109 also includes an electronic processor 115 and a non-transitory computer-readable memory 117. The memory 117 stores data and computer executable instructions that are executed by the electronic processor 115 to provide the functionality of the augmented reality system 109 (e.g., as described herein).

In some examples, the camera/movement sensor 111 includes a video camera that captures image data and transmits it to the electronic processor 115. The electronic processor 115 analyzes/processes the image data from the camera to detect objects and/or movement in the field of view of the camera. Based on this analysis, the electronic processor 115 generates additional graphical elements that are shown on the display 113. In some examples, the generated additional graphical elements appear to be superimposed or alongside other "real-world" object when shown on the display 113. In other examples, the camera/movement sensor 111 may include other sensor technologies—for example, sonar, radar, or lidar sensor—which capture data that is utilized by the electronic processor 115 to detect objects/movements and to generate the additional graphical elements to be shown on the display 113.

In some implementations, the augmented reality system 109 may be implemented as a "headset" device that is worn by a user such as, for example, the Microsoft HoloLens or the Google Glass. In some such implementations, the augmented reality system 109 includes one or more sensors 111 that communicate with the electronic processor 115 to monitor objects and movements in the user's field of view. Based on detected objects and/or movements, the electronic processor 115 generates and outputs graphical elements on a display 113 that is at least partially transparent, so that the graphical elements appear to the user to be superimposed and/or alongside other "real-world" objects in the user's field of view while the "real-world" objects remain visible through the transparent display 113.

In other implementations, the display 113 of the augmented reality system 109 may include a non-transparent, opaque display 113. In some such implementations, the camera/movement sensor 111 includes a video camera configured to captures "real-world" images that are then shown as a video output on the display 113 with additional graphical elements added to the video output by the electronic processor 115. In some such implementations, this type of augmented reality system is also provided as a "headset" device that is worn by the user with a camera (and possibly other additional sensors) affixed to the headset and with the display 113 positioned immediately in front of the eyes of the user to mimic the user's natural field of view. In other implementations, the camera/movement sensor(s) 111 may be positioned at a location remote from the user so that the user can still view and interact with objects in the field of view without actually being present at the site of the objects.

In some implementations (e.g., where the augmented reality system 109 is implemented as a "headset" device worn by the user), the electronic processor 115 of the augmented reality system 109 may be implemented in the same housing as the camera/movement sensor 111 and the display 113. However, in other implementations, the electronic processor 115 that is configured to analyze image/sensor data and generate the additional graphical elements to be shown on the display 113 may be implemented as a separate device/housing such as, for example, a laptop or tablet computer. Furthermore, instead of including an electronic processor 115 for the augmented reality system and a separate electronic processor 103 for the equipment controller 101, some implementations may include a single processor or controller that provides the image/sensor data processing, generates additional graphical elements, and provides control signals to the equipment actuator(s)/motor(s) 107. Accordingly, the examples provided below are only a few specific examples of implementations of equipment control systems. Other implementations are possible where functionality, such as described in these examples, is provided by any number of electronic processors/controllers associated with the augmented reality system, the equipment controller, both, or even other computing devices/controllers.

Figure 2:
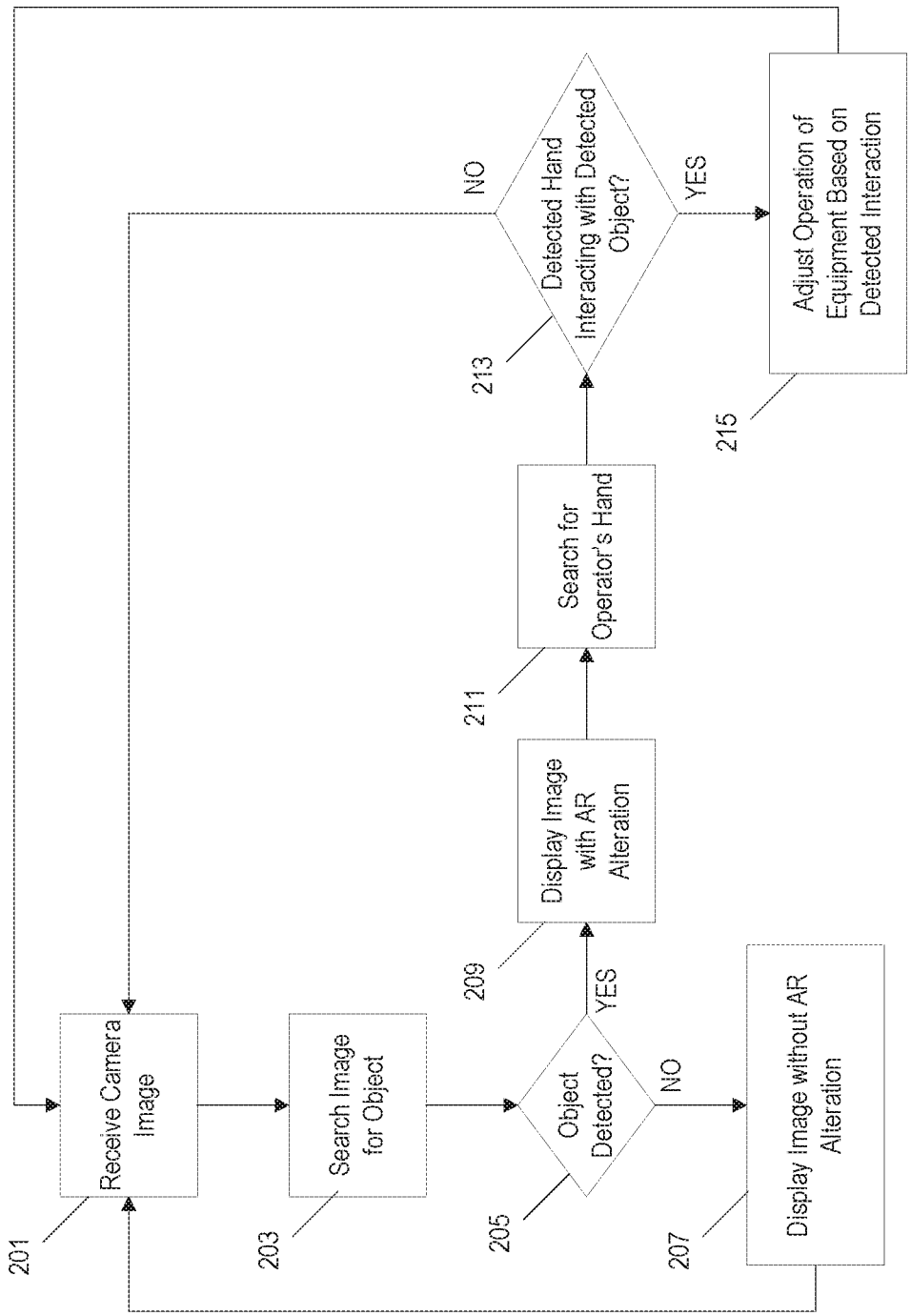
FIG. 2 is a flowchart of a method for controlling a machine using the augmented reality system of FIG. 1.

FIG. 2 illustrates an example of a method for controlling the operation of a tool or equipment using the system of FIG. 1. Although the example of FIG. 2 and other examples discussed below include a system configured to receive an analyze camera image data, in other implementations, the analysis and detection may be performed using data from other sensors in addition to or instead of camera image data.

The system receives camera image data (step 201) and an electronic processor (e.g., electronic processor 103, electronic processor 115, or another electronic processor) searches the captured image data for an object (step 203). As discussed in further detail below, in various different implementations, the object may include a part of the equipment itself (e.g., the blade of a motor grader) or another object in the environment that may be affected by the equipment (e.g., a log or pile of logs to be moved by a gripper device). In some implementations, the system is configured to search for the object in the captured data using image processing techniques such as, for example, edge detection and shape detection mechanisms. If the object is not automatically detected by the system (step 205), then the display 113 shows the "real-world" field of view without any additional graphical elements or AR alteration (step 207). However, if an object is detected, then the electronic processor will generate and output an AR alteration on the display (step 209). As discussed in further detail below, the AR alteration can include, for example, an outline around the detected object or an additional graphical element for manipulating the equipment with respect to the detected object.

The system is also configured to search for an operator's hand in the captured data (step 211). Again, the system may be configured to detect the operator's hand using any one of a variety of different image/data processing techniques including, for example, edge detection, shape detection, heat mapping, and movement tracking. If the system detects an operator's hand and determines that the operator's hand is interacting with the detected object in a predefined manner (step 213) (such as discussed in further examples below), the system adjusts the operation of the equipment based on the detected interaction (step 215). However, if the system does not detect an operator's hand in the captured camera/sensor data or does not determine that the operator's hand is interacting with a detected object in a predetermined manner, then the system continues to receive and process additional image/sensor data without adjusting the operation of the equipment.

Figure 3:
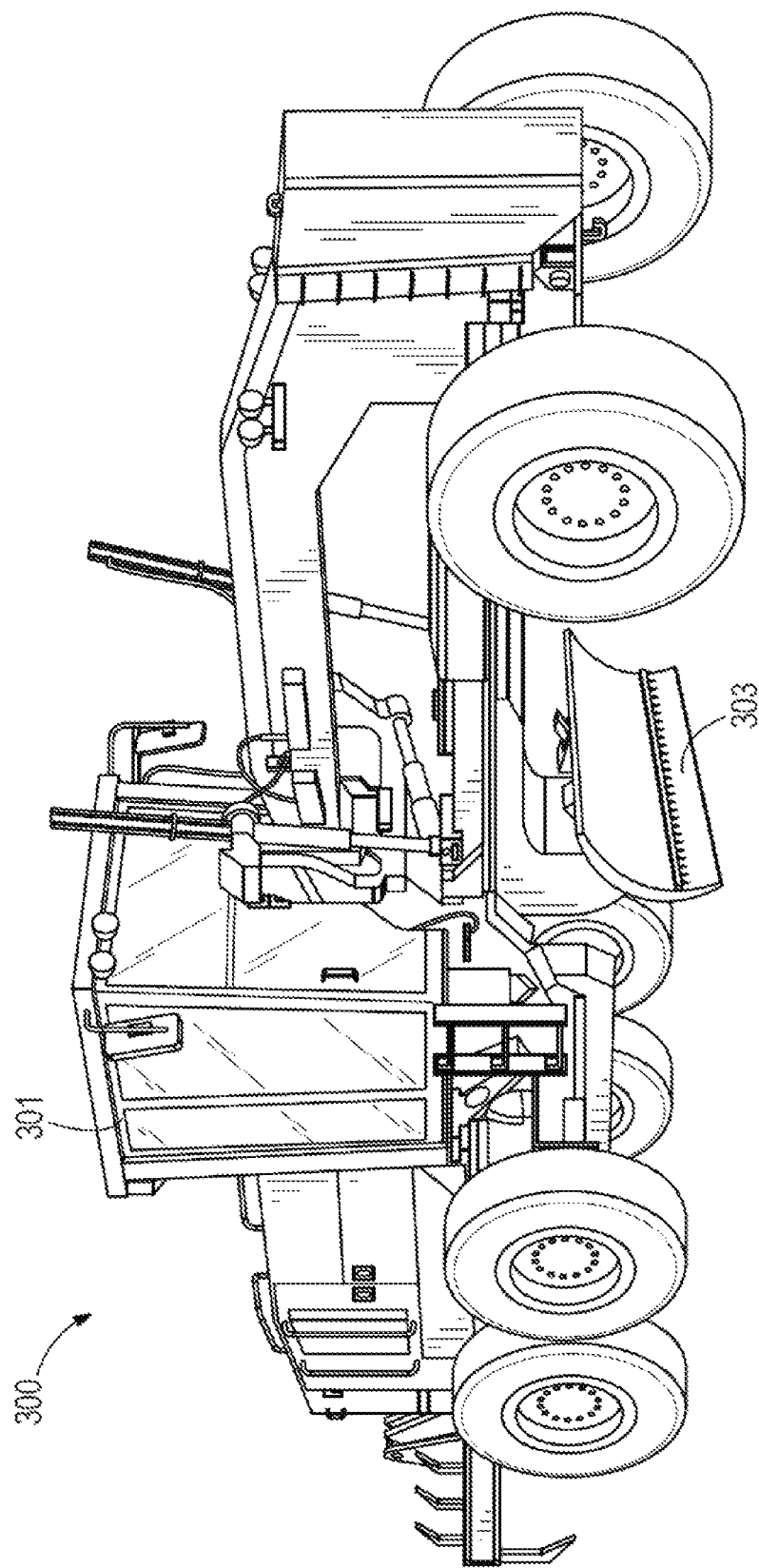
FIG. 3 is a perspective view of a motor grader machine controlled by the augmented reality system of FIG. 1.
Figure 4A:
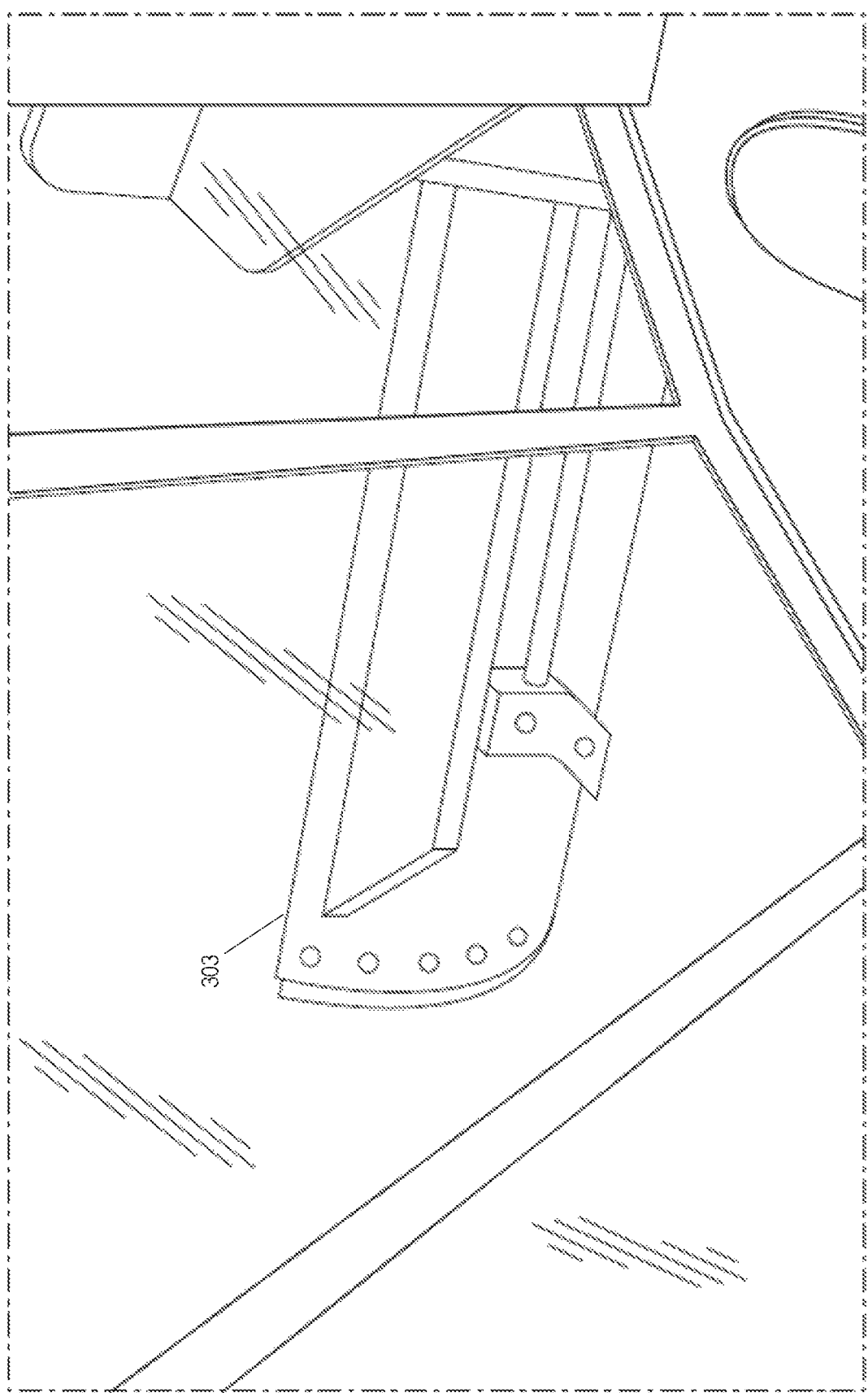
FIG. 4A is a display view output by the augmented reality system of FIG. 1 showing the blade of the motor grader machine of FIG. 3.
Figure 4B:
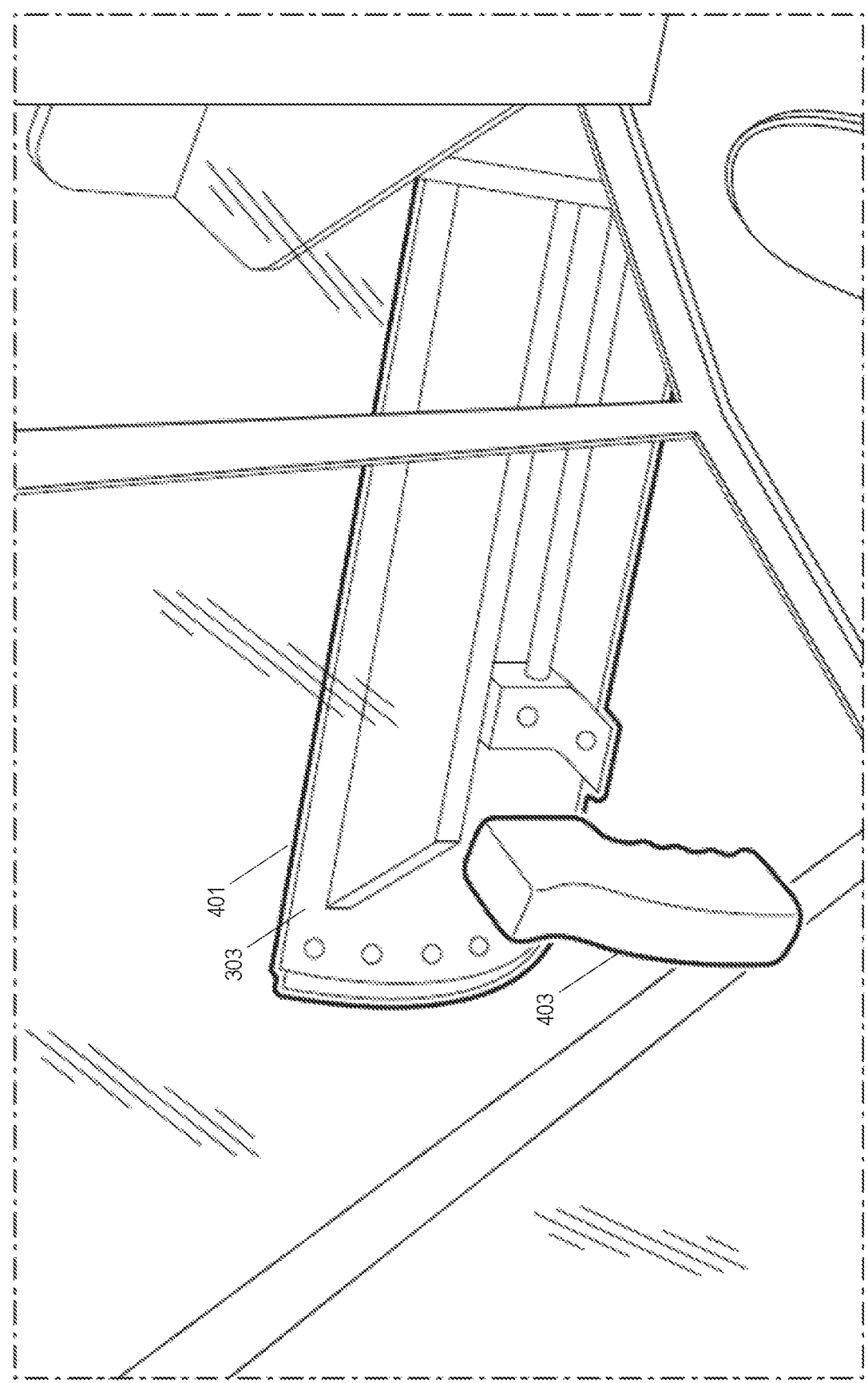
FIG. 4B is a display view output of the augmented reality system of FIG. 1 with a first virtual handle.
Figure 4C:
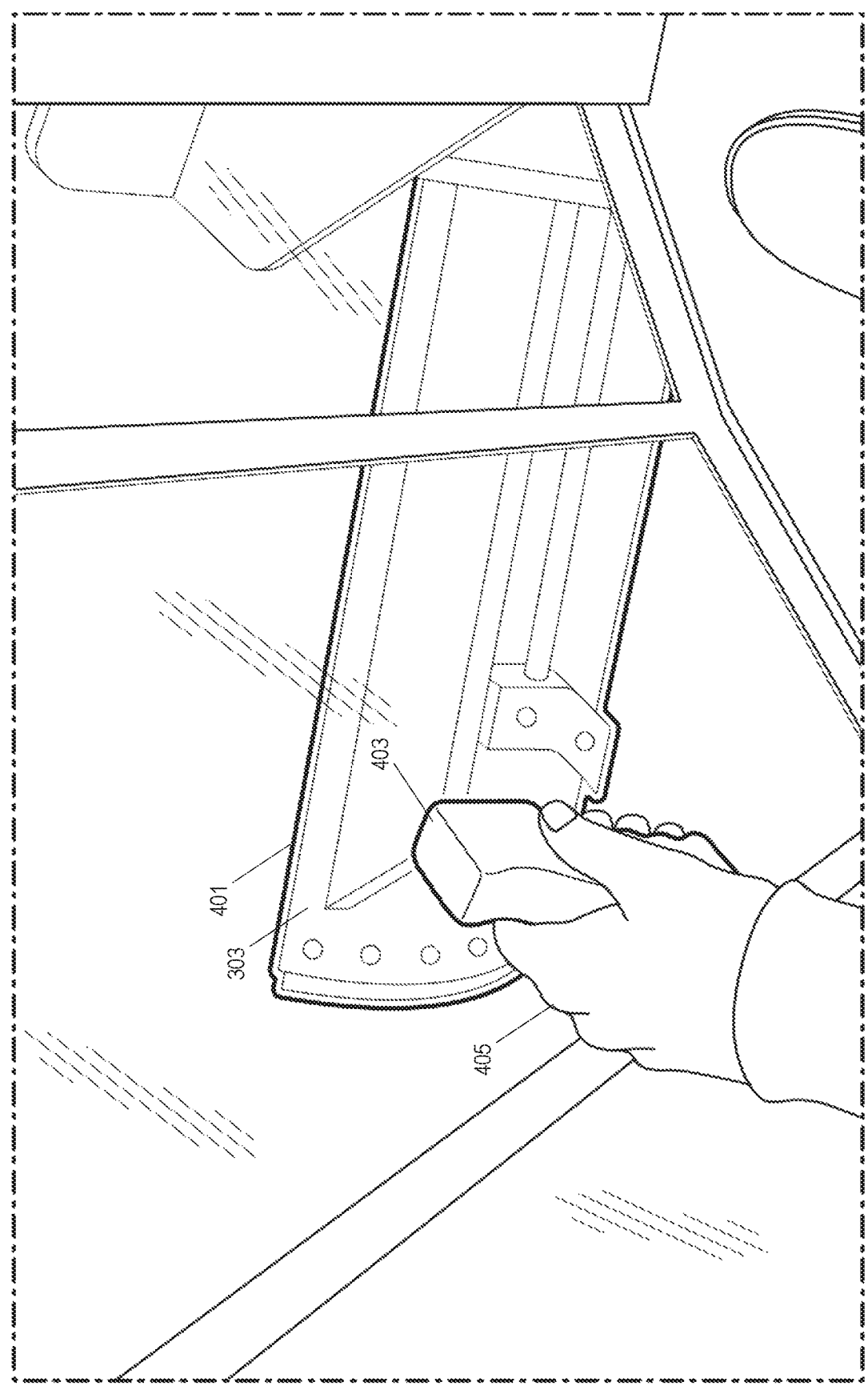
FIG. 4C is a display view output of the augmented reality system of FIG. 1 with a user interacting with the virtual handle of FIG. 4B.
Figure 4D:
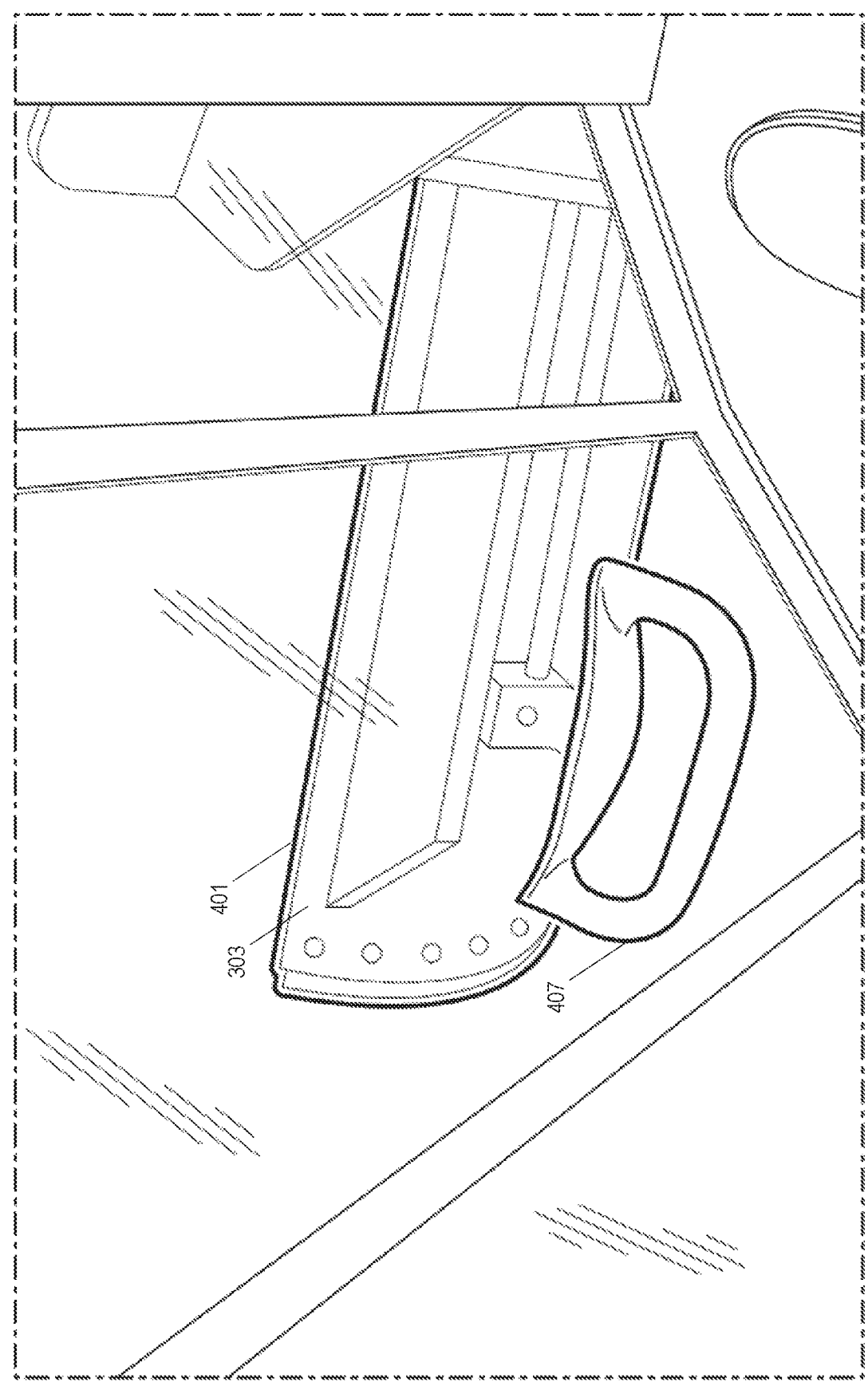
FIG. 4D is a display view output of the augmented reality system of FIG. 1 with another example of a virtual handle.
Figure 4E:
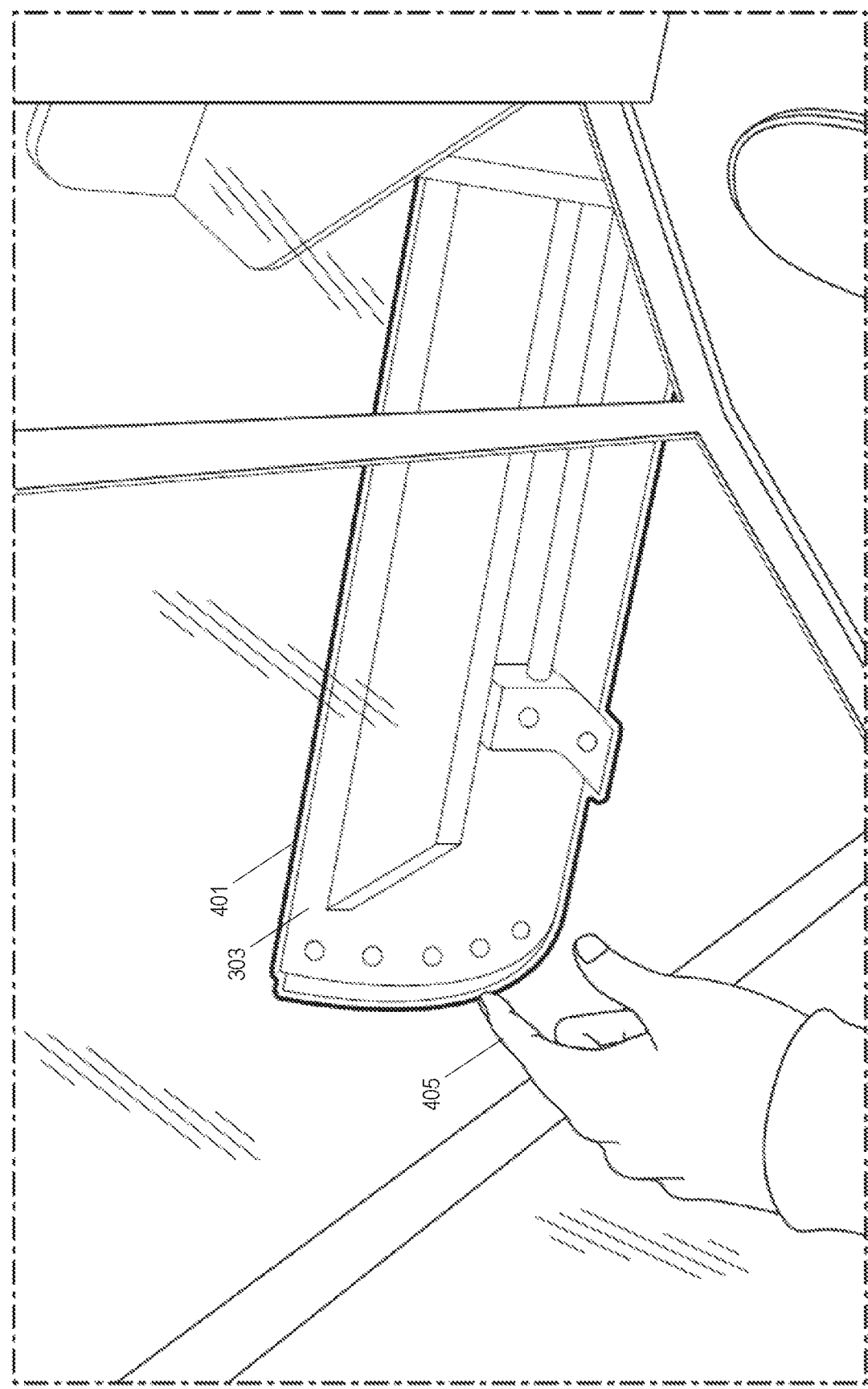
FIG. 4E is a display view output of the augmented reality system of FIG. 1 with a user employing hand motions to interact with the blade of the motor grader machine of FIG. 3.
Figure 5:
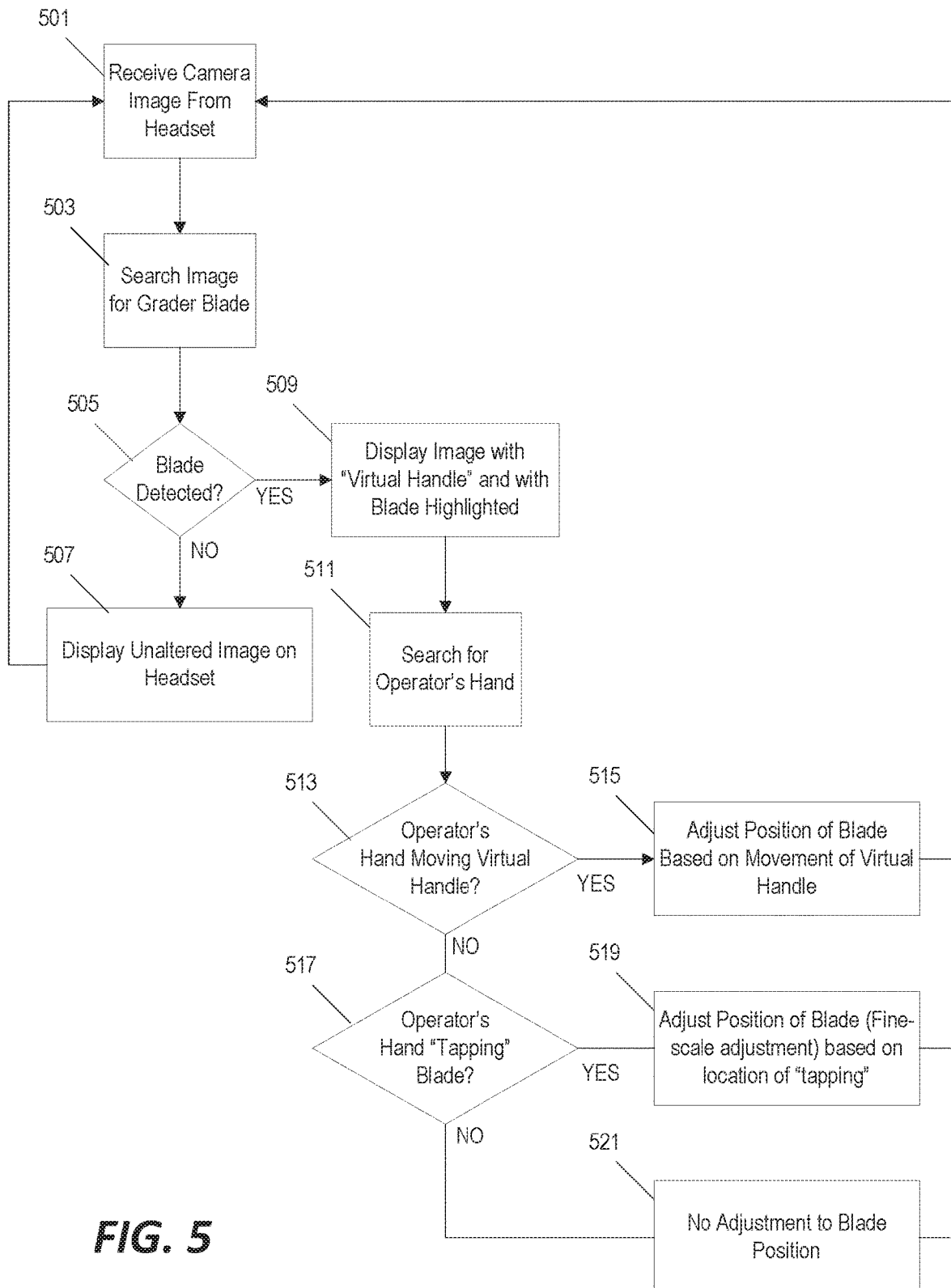
FIG. 5 is a flow chart of a method for adjusting the position of the blade of the motor grader machine of FIG. 3 using the display view interfaces of FIGS. 4A, 4B, 4C, 4D, and 4E.

FIGS. 3 through 5 illustrate a particular example of the system of FIG. 1 configured to adjust the position of a blade of a motor grader. FIG. 3 shows an example of a motor grader vehicle 300. The motor grader 300 includes a cab 301 where an operator sits while driving and operating the motor grader 300. A motor grader blade 303 is positioned near the bottom of the motor grader 300. The motor grader 300 also includes one or more actuators (not pictured) configured to adjust the position of the motor grader blade 303. For example, the actuators may be configured to receive signals from an equipment controller and, in response, operate to adjust a tilt angle of the blade 303 relative to ground and/or to adjust the position angle of the blade 303 relative to the vehicle (e.g., the angle of the blade as viewed overhead).

FIG. 4A shows an image from the interior of the cab 301 of the motor grader 300 from the perspective of an operator of the motor grader 300. In this example, the augmented reality system 109 is implemented as a "headset" device worn by the operator of the motor grader 300 while sitting in the cab 301 of the motor grader 300. The image of FIG. 4A would be visible to an operator through the display 113 of the augmented reality system 109—either as a video image output on a display screen 113 or as "real-world" objects visible through a partially transparent display 113. As shown in the example of FIG. 4A, the blade 303 of the motor grader 300 is visible on (or through) the display 113 when the operator turns to look towards the blade 303.

FIG. 4B shows the operator's view of the blade 303 through the display 113 with additional graphical elements generated by the augmented reality system 109. In particular, a graphical border 401 has been added around the edge of the blade 303 to highlight the blade 303. The augmented reality system 109 has also added a virtual handle 403 that is visible through the display. The virtual handle 403 is positioned and oriented relative to the blade 403 and appears to be located within the cab 301 of the motor grader 300 and within reach of the operator. As shown in FIG. 4C, the operator of the motor grader 300 can reach his hand 405 to "grab" the virtual handle 403.

As discussed in further detail below, moving the hand 405 while "grabbing" or "contacting" the virtual handle 403 will cause the system to adjust the operation of the motor grader 300 to effect an adjustment to the position of the blade 303 corresponding to the movement of the virtual handle 403. For example, if the virtual handle 403 is displayed on to the left of the operator's seat and the operator moves the virtual handle 403 forward, the system would detect this movement/manipulation of the augmented reality control element (e.g., the virtual handle 403) and, in response, operate the actuators of motor grader 300 to change the angle of the blade 303 such that the left side of the blade 303 moves forward and the right side of the blade (not visible in FIG. 4C) moves backwards towards the rear of the motor grader 300.

Furthermore, in some implementations, the system is configured to adjust other positioning characteristics of the blade 303 in response to other detected movements of the virtual handle. For example, in some implementations, when the system detects that the operator's hand 405 is "gripping" the virtual handle 403 and tilting the virtual handle 403 forward, the system will respond by operating the actuators to cause the blade 303 to tilt forward. Similarly, in some implementations, when the system detects that the operator's hand 405 is "gripping" the virtual handle 403 and moving it upward or downward, the system will respond by operating the actuators to cause the blade 303 to also move upward or downward. In some implementations, the system may be configured to only move the blade 303 via the virtual handle in response to movements made while the operator's hand is "gripping" the virtual handle 403. However, in some implementations, the system may be configured to respond to detected movements of the operator's hand that contact the virtual handle. Accordingly, a user might control and adjust the position of the blade 303 by using his fingertips to touch or push the virtual handle 403.

In some implementations, the system is configured to allow an operator to adjust certain user preferences. For example, the operator may define a preferred location of the virtual handle 403 to match the operator's arm length and preferred sitting position (e.g., adjusting the user preferences can cause the virtual handle to appear closer to or farther from the operator). User preferences might also be configured to allow the operator to adjust the sensitivity and responsiveness of the augmented reality control (e.g., how far the blade 303 will move in response to a particular movement of the virtual handle 403). In some implementations, user preferences can also be adjusted by an operator to allow the operator to adjust a "size" of the virtual handle or to select a "style" of virtual handle.

In the example of FIGS. 4B and 4C, the virtual handle 403 appears as a "pistol grip"-style handle. However, other forms of handles can be utilized as the displayed virtual handle. For example, in FIG. 4D, the virtual handle 407 is positioned generally parallel to the blade 303. In some implementations, the tilt angle of the blade 303 is adjusted using this parallel grip virtual handle 407 in response to detecting an operator's hand "rolling" the virtual handle 407 upward or downward. Similarly, the height of the blade 303 is adjusted in response to detecting an operator's hand moving the virtual handle 407 linearly upward or downward and the angle of the blade relative to the cab 301 is adjusted in response to the system detecting the operator's hand moving virtual handle 407 laterally to the left or right. In some implementations, the augmented reality system may be configured to use only one type of virtual handle (e.g., the pistol-grip virtual handle 403 or the parallel virtual handle 407); however, in other implementations, an operator may choose which virtual handle to utilize as a user preference.

Although the examples discussed above describe different movements of the virtual handle 403, 407 as discrete and separate movements (e.g., upwards/downwards, left/right, tilt forward/backward), in some implementations, the system is configured to detect more complex combination movements and to adjust multiple positioning parameters of the blade in parallel. For example, an operator may grab the virtual handle 407 and move it angularly upward and linearly forward while also rolling his wrist forward. In response to detecting this combination movement, the system would control the actuators to raise the blade 303 (in response to the linear upwards movement component) while also turning the blade angle to face further to the right (in response to the forward "push" movement component) and tilting the blade 303 further forward (in response to the tilting movement component). In some implementations, all of these positioning adjustments of the blade 303 are made simultaneously to appear as though the position and orientation of the blade 303 relative to the virtual handle 403, 407 is maintained.

In addition to adjusting the position of the blade 303 in response to detected movements of the virtual handle 403, 407, the system is also configured to adjust the position and orientation of the virtual handle itself. For example, in some implementations, the system may be configured to display the virtual handle 403, 407 to appear to maintain a fixed position and orientation relative to the operator's hand 405 while the operator's hand 405 is gripping the virtual handle. Accordingly, in response to detecting a tilt of the operator's wrist while gripping the virtual handle 403, 407, the system will cause the virtual handle 403, 407 itself to appear to tilt forward while remaining in the operator's gripped hand.

Furthermore, in some implementations, the system is configured to maintain the placement of additional graphical elements added by the augmented reality system (e.g., the virtual handle and the outline around the blade) relative to the "real-world" environment. Accordingly, in some implementations, the system is configured to repeatedly process received image/sensor data to regulate the positioning of any added graphical elements such that the graphical elements appear to remain stationary when the operator moves his head and changes his perspective/field of view.

Similarly, in some implementations, the system is configured to adjust the position/orientation of the blade 303 and the displayed position/orientation of the virtual handle 403, 407 to maintain an appearance of a mechanical coupling between the virtual handle 403, 407 and the blade 303. For example, in the examples discussed above, an operator can adjust the angle of the blade 303 by gripping the virtual handle and moving it linearly forward/backward or by moving it laterally to the left/right. In some implementations, in response to detecting a linear forward/backward movement of the virtual handle 403, 407, the system will be configured to adjust the position/orientation of the blade 303 as though the virtual handle 403, 407 were coupled to the blade 303 with a pair of pivot joints—accordingly, the angle of the virtual handle 403, 407 relative to the operator would not necessarily change in response to a change in the angle of the blade 303. Similarly, in some implementations, in response to detecting a lateral movement of the virtual handle 403, 407 to the left or right, the system will be configured to adjust the position/orientation of the blade 303 as though the virtual handle 403, 407 were coupled to the blade 303 with a single pivot joint. Accordingly, moving the virtual handle 403, 407 laterally to the left would cause the blade 303 to turn towards the right and moving the virtual handle 403, 407 to the right would cause the blade 303 to turn towards the left.

However, in some implementations, it is possible that an operator may move the virtual handle 403, 407 more quickly than the actuators are able to move the actual physical blade (e.g., in implementations where there is no mechanical resistance to movements of the virtual handle). Accordingly, the movements of the actual physical blade 303 may lag behind movements of the virtual handle. In some implementations, the system is configured to display a virtual blade and to adjust the displayed position of the virtual blade in real-time in response to movements of the virtual handle 403. The virtual blade shows the ultimate target position of the blade 303 before the actual blade 303 is able to physically complete its movement to that target position/location.

In some implementations, the virtual blade is the same as the graphical border 401 that is displayed around the edge of the blade 303 in the examples of FIG. 4B. In such implementations, the graphical border 401 is positioned around the edge of the blade 303 as shown in FIG. 4B until the operator manipulates the virtual handle 403. Then the graphical border 401 moves to the target location of the blade 303 based on the detected movement of the virtual handle 403. The blade 303 continues to move until it reaches its target location/position and comes to rest at a location/position where it is again surrounded by the graphical border 401.

In other implementations, the virtual blade may be shown on the display as a "ghost" or partially transparent version of the blade that appears on the display when the virtual handle is manipulated and is removed from the display when the blade 303 reaches the target position. In such implementations, the graphical border 401 may continue to be displayed around the edge of the blade 303 as the blade 303 moves to its target position even if movement of the blade 303 lags behind movement of the virtual handle 403 and the "virtual blade."

In some implementations, the system may be configured to adjust the same parameter of the blade 303 in response to multiple different types of movements of the virtual handle 403, 407 such that, for example, the angle of the blade would be adjusted in response to both left/right lateral movements and forward/back linear movements. In some such implementations, the system may be configured such that the speed or degree to which the blade's angle is adjusted would be different depending on movement used to move the virtual handle. For example, the system might be configured to adjust the angle of the blade in response to both forward/backward movements and left/right movements of the virtual handle. However, the system may be configured such that the magnitude of blade movement is greater in response to a forward/backward movement of the virtual handle than compared to a movement of the virtual handle by the same distance in the left/right direction. Accordingly, in some implementations, the system may be configured to provide for "fine tuning" position adjustments of the blade by moving the virtual handle in a first direction and "larger scale" position adjustments of the blade by moving the virtual handle in a different direction.

Similarly, in some implementations, the system may be configured to adjust a parameter of the blade 303 differently in response to a speed of the movement of the virtual handle. For example, the system may be configured to adjust a scale of movement of the blade relative to movement of the virtual handle based in part on the speed of the movement of the virtual handle. Accordingly, in some implementations, moving the virtual handle at a first lower speed will result in a smaller magnitude movement of the blade than moving the virtual handle in the same direction and the same distance at a faster speed.

Furthermore, in some implementations, "fine tuning" adjustments of the blade can be provided in response to other hand motions that may or may not involve the virtual handle 403, 407. For example, in FIG. 4E, the operator's hand 405 is shown motioning towards the far left edge of the blade 303. In some implementations, the system is configured to monitor the movement of the operator's hand 405 and to provide a "fine tuning" adjustment of the position of the blade in response to a "tapping" motion. For example, in some implementations, the system is configured to raise the blade upward by a relatively small amount in response to each upward "tap" by the operator's hand 405 near the bottom edge of the blade 303. Conversely, the system may be configured to lower the height of the blade by a relatively small amount in response to each downward "tap" by the operator's hand 405 near a top edge of the blade 303. Similarly, the system may be configure to move the blade 303 linearly to the right in response to a tapping detected near the left edge of the blade 303 and to move the blade 303 linearly to the left in response to a tapping detected near the right edge of the blade 303.

In some implementations, the system is further configured to regulate the magnitude of the adjustment based on a linear position of the "tapping." For example, the system might be configured to cause a larger movement of the blade in response to a "tap" detected towards the center of the blade and a relatively small movement of the blade in response to a "tap" detected towards the far edge of the blade (or vice versa). Similarly, in some implementations, the system may be configured to adjust the magnitude of blade movement based on a speed of the tapping motion (e.g., a faster "tapping" movement would cause the system to turn the blade more than it would in response to a slower "tapping" movement).

FIG. 5 illustrates an example of a method for adjusting the position and orientation of a motor grader blade 303 with respect to the illustrations of FIGS. 4A through 4E. The system receives a camera image (e.g., a still image or video) from the camera/sensor affixed to the headset device worn by the operator (step 501). The system applies one or more image processing techniques to search the image data for a grader blade in the field of view of the camera (step 503). If the system is not able to automatically detect a grader blade in the camera image (step 505), then the augmented reality system does not generate or display any AR alterations (e.g., additional graphical elements) (step 507). However, if the grader blade is detected in the image data, then the system displays a virtual handle and adds graphical elements highlighting the blade (step 509). While the additional graphical elements are displayed by the augmented reality system, the system continues to search the received image data to detect an operator's hand and to monitor movements/positioning of the hand (step 511). If the system detects the operator's hand grabbing and moving the virtual handle (step 513), then the system operates the actuators to adjust the position of the blade based on the detected movements of the virtual handle (step 515). If the system detects the operator's hand "tapping" the highlighted blade (step 517), then the system operates the actuators to provide a smaller, fine-scale adjustment of the position of the blade based on the tapping (and, in some implementations, based on the location and/or speed of the tapping motion) (step 519). However, if none of the predefined control movements are detected (e.g., no gripping/moving of the virtual handle and no tapping of the blade), then the system does not make any adjustments to the blade (step 521).

In the examples discussed above, the system is configured to automatically detect certain objects in the field of view of the augmented reality system based on image or sensor data. However, in some implementations, the system may be configured to identify one or more objects in response to detected hand movements of the operator. For example, the system might be configured to identify the blade of the motor grader or to identify another object in the field of view of the augmented reality system in response to a user "tapping" the object.

Figure 6:
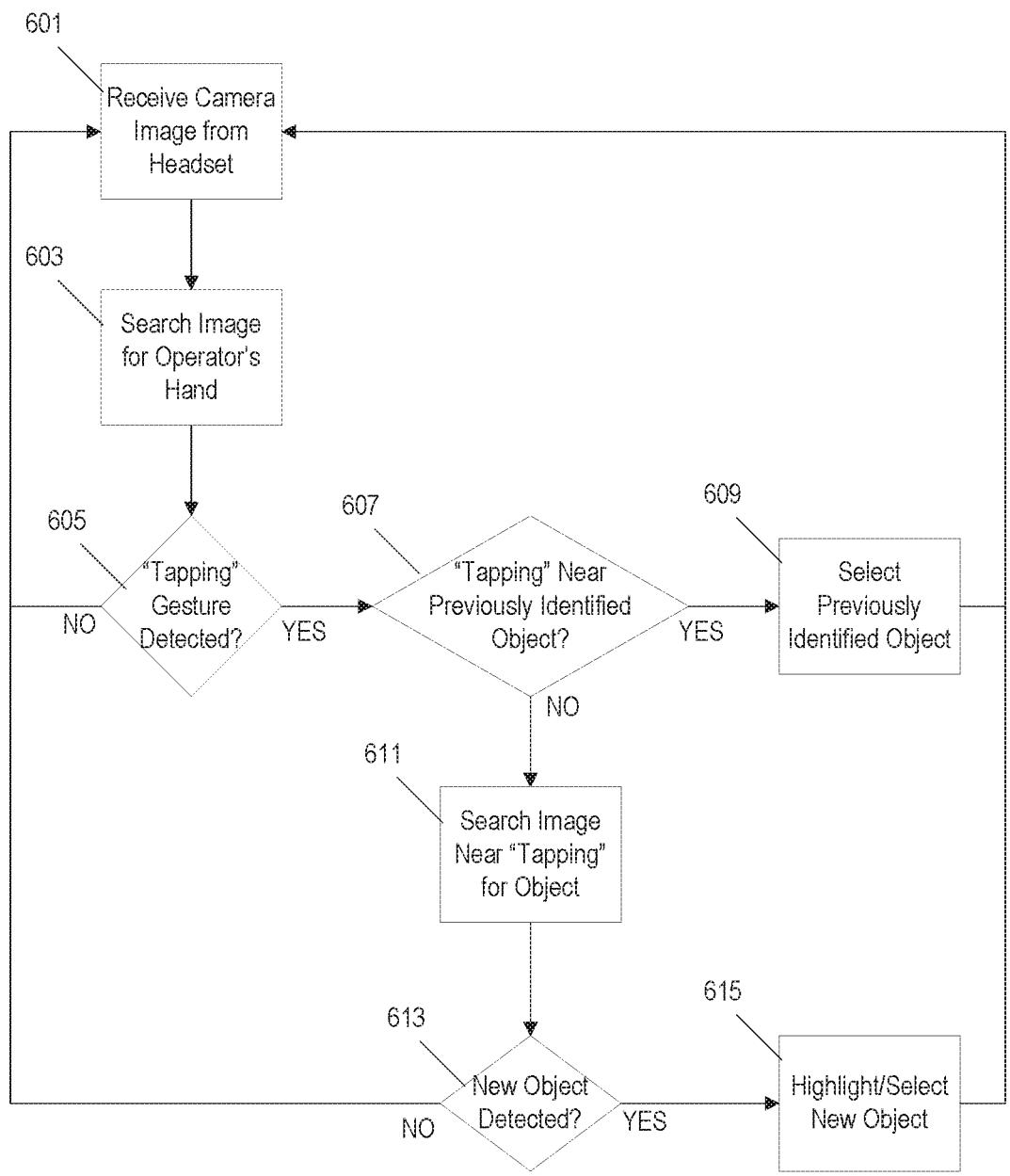
FIG. 6 is a flowchart of a method for identifying and selecting a real-world object using the interface of the augmented reality system of FIG. 1.

FIG. 6 illustrates one example of a method for identifying and selecting an object in the augmented reality system based on an operator input (e.g., a hand motion). The system receives camera image from the headset (step 601) and searches the image for the operator's hand (step 603). If not "tapping" gesture is detected (step 605), then the system continues to monitor incoming camera data until a tapping gesture is detected. Once a "tapping" gesture is detected, the system determines whether the "tapping" gesture occurred near a previously identified object (step 607). If so, then the system selects the previously identified object and, in some implementations, adjusts or adds an additional graphical element on the display indicating that the object has been selected (step 609). However, if the system determines that there is no previously identified object near the location of the detected "tapping" gesture, then the system searches the image data near the "tapping" to attempt to identify an object (e.g., using an edge detection mechanism) (step 611). If a new object is detected near the location of the tapping gesture (step 613), the system stores an indication of the object as a "previously identified object" for future use and highlights/selects the new object (step 615).

In some implementations, a manual object selection process such as illustrated in FIG. 6 can be used to supplement the automatic object detection mechanism described in the examples above. In other implementations, the manual object selection process may be used instead of an automatic detection process such that an operator using the augmented reality system to operate the motor grader in the examples above would first need to manually select/identify the blade.

Similarly, in some implementations, the system may be configured to control the operation of multiple different devices or systems. For example, the system may be communicatively coupled to both a motor grader blade and an excavator. To use the motor grader blade, the operator would turn his field of view towards the blade and select the blade as illustrated in FIG. 6. Then the operator would be able to adjust the position of the blade as discussed in the previous example. However, to use the excavator, the operator would turn his field of view towards the excavator and select the excavator bucket or arm as illustrated in FIG. 6. The operator would then be able to control the operation of the excavator using the augmented reality system.

The examples described above primarily focus on systems and techniques where an operator uses the augmented reality system to control a piece of equipment and, in some cases, to identify and select the piece of equipment to be controlled. Furthermore, in these examples, the detected predefined hand gestures and movements are directed towards the equipment itself (e.g., tapping the motor grader blade or adjusting its position by manipulating a virtual handle). However, in some implementations, the system is configured to control the operation of the equipment based on hand gestures directed towards an object that is to be affected by the equipment.

For example, in some implementations, the system may be configured to control the operation of an excavator (as discussed brief above). The system may be configured to detect hand gestures that identify a location on the ground where the excavator is to dig (e.g., using a method similar to the one illustrated in FIG. 6). In some such implementations, the system would be configured to respond to a detected "tapping" gesture on a location by displaying a shape over the location. The operator would then adjust the size, location, and/or shape of this additional graphical element using hand gestures (e.g., moving his hands or fingers away from each other to increase the size of the overlaid graphical element) to identify the boundaries of the area where the digging is to occur. Alternatively or additionally, the system in some implementations might be configured to recognize a hand gesture drawings a shape around an area (e.g., a box or a ellipse) and to identify the area within the drawn shape as the selected area for digging. Furthermore, in some implementations, the system is further configured to allow a user to "deselect" a selected area by "tapping" the selected and highlighted area. In this way, a user is able to refine a selection in the event that the system responds to the user's gestures and the image searching by automatically identifying and selecting an object/area different than the object/area intended by the user.

In some implementations, the system might be further configured to display additional information about the selected area (including, for example, an area measurement, a material constructions (e.g., dirt, concrete, etc.), etc.). The system may also display one or more selectable options as additional overlaid graphical elements. For example, the system might be configured to display a drop-down menu or other control that allows the operator to define how deep the excavator is to dig in the selected location. Once the digging parameters are defined through the augmented reality interface, the user can perform a hand gesture or activate another external control that causes the excavator system to initiate an automated digging process at the selected location.

In another example, the system may be configured to lift logs onto a truck using a gripper arm. In some implementations, the system may be configured to respond to a detected "tapping" gesture on a location by searching the nearby location for a pile of log (or by identifying a detected object at the location of the "tapping" as a selected pile of logs). The system is configured such that, after one or more logs are selected by "tapping" using the augmented reality interface, the system would respond by automatically positioning the gripper arm above the log (or logs), gripping the log(s), moving the gripper arm with the log over the truck bed, and placing the log(s) on the truck bed. Again, in some implementations, the system is further configured to select a log (or logs) by detecting a hand gesture by the user drawing a shape (e.g., a rectangle or an ellipse) around an area and searching/detecting a log (or logs) within the selected area. Furthermore, in some implementations, the system is configured to "deselect" a selected log (or logs) in response to detecting a hand gesture "tapping" a log (or logs) that has been "selected" in response to a previous gesture or automatic image searching.

In yet another example, the system may be configured to control a system for harvesting and removing trees. In some implementations, the system may be configured to respond to a detected "tapping" gesture by searching the nearby location for a tree or by identifying a detected object at the location of the "tapping" as a selected tree. The system is configured such that, after a tree is selected by "tapping" using the augmented reality interface, the system would respond by automatically positioning and actuating a saw blade to cut the tree (and, in some cases, to grip and remove the tree after it is cut).

Although the examples illustrated above focus primarily on adjustments of the equipment in response to movements of the virtual handle 403, 407 and in response to "tapping" motions of the operators hand, in some implementations, the system may be configured to operate the equipment actuator(s) in response to detecting other specific types of movements of the operator's hand(s) or arm(s). For example, a system might be configured to adjust an operation of the equipment (e.g., a motor grader or other equipment) in a particular way in response to detecting a "pinching" movement of the operator's fingers, a waving of the operator's arms, or a movement of the operator's hand with an open palm or with a fist.

Furthermore, the examples discussed above primarily focus on augmented reality systems that include a "headset" device worn by an operator that is at the same location as the equipment. However, in other implementations, the system may be configured to display image data and the additional graphical elements to an operator that is not physically located at the same perspective as the camera/sensors. In such cases, the system may be configured to operate more as a "virtual reality" system in which the operator is able to manipulate and control equipment from a different physical position/orientation.

Similarly, the examples described above provide systems where the operator is able to view "real-world" objects either directly through a transparent display or indirectly as camera images captured by the system and shown on the display. However, in some implementations, the system may be configured to provide a different perspective view that does not necessarily replicate the "real-world" view of a camera. The system may be configured to process the image/sensor data, detect objects in the field of view, and display only graphical elements that are representative of relevant identified objects. For example, in the examples of FIGS. 3 through 5, an operator may activate the augmented reality control system by pressing a button (or performing a particular gesture) and, in response, the system would enter a "blade adjustment mode." While operating in the blade adjustment mode, the system would "black-out" the partial transparent display or omit the actual camera images from the images shown on a non-transparent display. The system might be configured to instead display only graphical representations of the blade 303, the motor grader 300, the virtual handle 403, and the operator's hand 405. This would allow the operator to interact with the graphical elements to control/adjust the blade position without distraction in the displayed interface.

Other particular augmented and virtual reality interfaces and mechanisms might also be utilized.

Thus, the invention provides, among other things, a system and method for controlling the operation of an equipment device using an augmented reality or virtual reality interface. Various features and advantages of the invention are set forth in the following claims.

What is claimed is:

1. A system for operating machinery, the system comprising:
   a display;
   an object sensor; and
   a controller configured to
   detect an object visible via the display based at least in part on sensor data from the object sensor, wherein the detected object includes an operable tool of the machinery,
   generate a graphical element corresponding to the detected object, wherein the graphical element includes a virtual handle, wherein the virtual handle has an appearance of a hand-manipulable control and is not a graphical representation of any part of the operable tool,
   output the graphical element on the display, detect an interaction of an operator's hand with the virtual handle, wherein the operator's hand is visible via the display and is detected based at least in part on the sensor data from the object sensor, and wherein detecting the interaction of the operator's hand with the virtual handle includes detecting the operator's hand positioned at a location corresponding to the virtual handle and moving while contacting the virtual handle, and transmit a control signal to an actuator corresponding to the operable tool, wherein the transmitted control signal is configured to cause the actuator to adjust a position of the operable tool in a direction corresponding to the detected movement of the operator's hand while contacting the virtual handle.

2. The system of claim 1, wherein the controller is configured to detect the object based at least in part on the sensor data by automatically detecting a blade of a motor grader, and wherein the controller is configured to transmit the control signal to the actuator corresponding to the operable tool by transmitting a control signal to a motor grader actuator, wherein the control signal is configured to cause the motor grader actuator to adjust a position of the blade based on the detected interaction of the operator's hand with the graphical element.

3. The system of claim 1, wherein the controller is further configured to generate and output a virtual tool on the display, wherein a position and orientation of the displayed virtual tool moves in real-time in response to movements of the virtual handle, and wherein movement of the operable tool by the actuator lags behind movement of the displayed virtual tool and ultimately comes to rest at the position and orientation of the displayed virtual tool.

4. The system of claim 1, wherein the controller is further configured to adjust a displayed position of the virtual handle based on the detected movements of the operator's hand while contacting the virtual handle so that the virtual handle appears to move with the operator's hand.

5. The system of claim 1, wherein the controller is further configured to:
generate and display a second graphical element highlighting a location of the operable tool visible via the display;
detect an interaction of the operator's hand with the second graphical element; and
transmit a second control signal to the actuator, wherein the second control signal is configured to cause the actuator to adjust the position of the operable tool in a direction corresponding to the detected interaction of the operator's hand with the second graphical element.

6. The system of claim 5, wherein the controller is configured to detect the interaction of the operator's hand with the second graphical element by detecting a tapping motion toward a location on the operable tool, and wherein the second control signal is configured to cause the actuator to adjust the position of the operable tool in a direction corresponding to the location or a direction of the detected tapping motion.

7. The system of claim 6, wherein the second control signal is configured to cause the actuator to move the operable tool upward in response to detecting the tapping motion of the operator's hand in an upward direction at a location corresponding to a lower edge of the operable tool.

8. The system of claim 6, wherein the second control signal is configured to cause the actuator to tilt the operable tool forward in response to detecting the tapping motion of the operator's hand at a location corresponding to a top side of the operable tool.

9. The system of claim 6, wherein the controller is configured to cause a large-scale adjustment of the position of the operable tool by generating the control signal in response to detecting the interaction of the operator's hand with the virtual handle and is configured to cause a small-scale adjustment of the position of the operable tool by generating the second control signal in response to detecting the tapping motion of the operator's hand towards the location corresponding to the location of the operable tool.

10. The system of claim 1, further comprising a headset device,
wherein the headset device includes the display and the object sensor such that a field view of the object sensor moves with movements of an operator's head while wearing the headset device,
wherein the display includes an at least partially transparent graphical display screen configured to output graphical elements in a field of view of the operator while real world objects are visible to the operator through the at least partially transparent graphical display screen, and
wherein the controller is configured to detect an object visible via the display by detecting a real world object that is visible to the operator through the at least partially transparent graphical display screen.

11. The system of claim 1, wherein the object sensor includes a camera, and wherein the controller is configured to detect the object based at least in part on sensor data from the object sensor by processing image data received from the camera to detect the object in the image data.

12. The system of claim 1, wherein the controller is configured to detect the object based at least in part on sensor data from the object sensor by
detecting a pointing motion of an operator's hand towards a location in a field of view of the object sensor, and
applying an edge finding routine to the sensor data received from the object sensor to detect an object at the location of the pointing motion.

13. A system for operating machinery, the system comprising:
a display;
an object sensor; and
a controller configured to
detect an object visible via the display based at least in part on sensor data from the object sensor, wherein the detected object includes an operable tool of the machinery,
generate a graphical element highlighting a location of the operable tool visible via the display, and
output the graphical element on the display,
detect an interaction of an operator's hand with the graphical element, wherein the operator's hand is detected based at least in part on the sensor data from the object sensor, and wherein detecting the interaction of the operator's hand with the graphical element includes detecting a tapping motion towards a location on the operable tool visible via the display, and
transmit a control signal to an actuator corresponding to the operable tool, wherein the transmitted control signal is configured to cause the actuator to adjust a position of the operable tool in a direction corresponding to at least one selected from a group consisting of the location of the detected tapping motion and a direction of the detected tapping motion.

14. A system for adjusting a position of a blade of a motor grader using augmented reality, the system comprising:
a headset including a display and an object sensor,
   wherein the display includes an at least partially transparent graphical display screen configured to output graphical elements in a field of view of an operator wearing the headset while real world objects are visible to the operator through the at least partially transparent graphical display screen, and
   wherein the object sensor is positioned on the headset with a field of view that at least partially overlaps with the field of view of the operator wearing the headset; and
a controller configured to
   detect a location of the blade of the motor grader in the field of view of the operator based at least in part on sensor data received from the object sensor,
   generate and output on the display a virtual handle for the blade of the motor grader,
   detect a movement of the operator's hand while contacting the virtual handle based at least in part on sensor data from the object sensor, and
   transmit a control signal to a motor grader actuator, wherein the control signal is configured to cause the motor grader actuator to adjust a position of the motor grader blade in a direction and a magnitude corresponding to the detected movement of the operator's hand while contacting the virtual handle.

15. The system of claim 14, wherein the controller is further configured to
   detect a tapping motion of the operator's hand towards a location on the blade of the motor grader, and
   transmit a second control signal to the motor grader actuator, wherein the second control signal is configured to cause the motor grader actuator to adjust the position of the motor grader blade in a direction corresponding to the detected movement of the operator's hand,
   wherein a magnitude of the position adjustment caused by the second control signal in response to detecting the tapping motion is smaller than a magnitude of the position adjustment caused by the control signal in response to detecting the movement of the operator's hand while gripping the virtual handle.

* * * * *